US010719112B2

(12) United States Patent
Bodnaruk et al.

(10) Patent No.: US 10,719,112 B2
(45) Date of Patent: Jul. 21, 2020

(54) DYNAMIC VCONN SWAPPING IN DUAL-POWERED TYPE-C CABLE APPLICATIONS

(71) Applicant: Cypress Semiconductor Corporation, San Jose, CA (US)

(72) Inventors: Nicholas Alexander Bodnaruk, Sunnyvale, CA (US); Pradeep Kumar Bajpai, Sunnyvale, CA (US); Godwin Gerald Arulappan, Sunnyvale, CA (US); Hamid Khodabandehlou, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/383,229

(22) Filed: Apr. 12, 2019

(65) Prior Publication Data

US 2019/0332150 A1 Oct. 31, 2019

Related U.S. Application Data

(63) Continuation of application No. 16/123,157, filed on Sep. 6, 2018, now Pat. No. 10,317,969.
(Continued)

(51) Int. Cl.
*G06F 1/26* (2006.01)
*H02J 1/10* (2006.01)
*G06F 13/38* (2006.01)

(52) U.S. Cl.
CPC ............ *G06F 1/263* (2013.01); *G06F 13/385* (2013.01); *H02J 1/10* (2013.01); *G06F 2213/0042* (2013.01)

(58) Field of Classification Search
CPC .... H02J 1/10; H02J 2009/068; H03K 17/005; H03K 17/687; H03K 17/6871;
(Continued)

(56) References Cited

U.S. PATENT DOCUMENTS 9,065,430 B2 6/2015 Seth et al.
9,400,546 B1 7/2016 Agarwal et al.
(Continued)

OTHER PUBLICATIONS

CCG3 Architecture Technical Reference Manual (TRM), Cocument No. 002-04130 Rev. **, Cypress Semiconductor, Nov. 25, 2015, 228 pages.
(Continued)

*Primary Examiner* — Fred E Finch, III (57) ABSTRACT

A semiconductor device for a USB Type-C cable includes a first terminal to couple to a first VCONN line from a first end of the cable, a second terminal to couple to a second VCONN line from the second end of the cable, a charge pump, and a switch circuit coupled to the first terminal and the second terminal. The switch circuit includes a first drain-extended n-type field effect transistor (DENFET) coupled between the first terminal and an internal power supply of the semiconductor device; a first pump switch coupled between the charge pump and a gate of the first DENFET; a second DENFET coupled between the second terminal and the internal power supply; and a second pump switch coupled between the charge pump and a gate of the second DENFET.

18 Claims, 6 Drawing Sheets

Related U.S. Application Data (60) Provisional application No. 62/663,382, filed on Apr. 27, 2018.

(58) Field of Classification Search
CPC .................. H03K 17/73; H03K 17/731; G06F 1/26–266; G06F 2213/0042; H02M 1/08
See application file for complete search history.

(56) References Cited

U.S. PATENT DOCUMENTS

| | | | |
|---|---|---|---|
| 9,727,123 | B1 | 8/2017 | Nayak et al. |
| 9,800,233 | B1 | 10/2017 | Hilal |
| 9,899,925 | B2 | 2/2018 | Sheng et al. |
| 10,009,030 | B2 | 6/2018 | Kim et al. |
| 10,317,969 | B1* | 6/2019 | Bodnaruk ............... G06F 1/263 |
| 2009/0079264 | A1* | 3/2009 | Minami .................. G06F 1/266 307/44 |
| 2011/0068626 | A1* | 3/2011 | Terlizzi ..................... H02J 1/08 307/32 |
| 2011/0266624 | A1 | 11/2011 | Duvvury et al. |
| 2016/0004650 | A1* | 1/2016 | Yamasaki ............... G06F 1/266 710/63 |
| 2016/0139640 | A1 | 5/2016 | Hijazi et al. |
| 2016/0179155 | A1 | 6/2016 | Lester |
| 2016/0308527 | A1* | 10/2016 | Kim ..................... H03K 19/003 |
| 2017/0060216 | A1 | 3/2017 | Waters et al. |
| 2017/0207694 | A1* | 7/2017 | Strijker ................. H02J 7/0052 |
| 2017/0222459 | A1* | 8/2017 | Kang ................... H01R 31/065 |
| 2017/0222464 | A1 | 8/2017 | Pullen et al. |
| 2017/0262035 | A1* | 9/2017 | Agarwal .................. G06F 1/266 |
| 2017/0317583 | A1 | 11/2017 | Forghani-zadeh et al. |
| 2017/0336819 | A1 | 11/2017 | Pons |
| 2017/0344098 | A1 | 11/2017 | Hilal |
| 2017/0344508 | A1* | 11/2017 | Setiawan ............ G06F 13/4282 |
| 2017/0346240 | A1* | 11/2017 | Oporta ...................... G05F 3/02 |
| 2018/0109134 | A1* | 4/2018 | Carpenter ............... H02J 7/345 |
| 2018/0120910 | A1* | 5/2018 | Farkas .................... G06F 1/266 |
| 2018/0152183 | A1 | 5/2018 | Vemula |
| 2018/0173265 | A1 | 6/2018 | Leinonen et al. |
| 2018/0278080 | A1 | 9/2018 | Matoba |
| 2018/0292880 | A1* | 10/2018 | Nakadokoro .......... G09G 5/006 |
| 2018/0341309 | A1* | 11/2018 | Sporck .................... G06F 1/266 |
| 2018/0341310 | A1* | 11/2018 | Lambert ................. G06F 1/266 |
| 2019/0033953 | A1* | 1/2019 | Kadgi ................. G06F 13/4282 |
| 2019/0036332 | A1* | 1/2019 | Kobayashi .............. H02J 1/102 |
| 2019/0104586 | A1* | 4/2019 | Yu ........................... H02J 7/027 |
| 2019/0288532 | A1* | 9/2019 | Mattos ................. H02J 7/0034 |
| 2019/0310700 | A1* | 10/2019 | Waters .................. G06F 1/3296 |
| 2019/0319446 | A1* | 10/2019 | Mondal ............... H01L 27/0266 |
| 2019/0319447 | A1* | 10/2019 | Mukhopadhyay ....... H03K 5/24 |

OTHER PUBLICATIONS

USPTO Notice of Allowance for U.S. Appl. No. 16/123,157 dated Jan. 3, 2019, 8 pages.

International Search Report for International Application No. PCT/US2019/025117 dated May 1, 2019, 2 pages.

Written Opinion of the International Searching Authority for International Application No. PCT/US2019/025117 dated May 1, 2019, 3 pages.

\* cited by examiner

| | A1 | A2 | A3 | A4 | A5 | A6 | A7 | A8 | A9 | A10 | A11 | A12 |
|---|---|---|---|---|---|---|---|---|---|---|---|---|
| | GND | TX1+ | TX1− | Vbus | CC | D+ | D− | SBU1 | Vbus | RX2− | RX2+ | GND |
| | GND | RX1+ | RX1− | Vbus | SBU2 | | | VCONN | Vbus | TX2− | TX2+ | GND |
| | B12 | B11 | B10 | B9 | B8 | B7 | B6 | B5 | B4 | B3 | B2 | B1 |

DYNAMIC VCONN SWAPPING IN DUAL-POWERED TYPE-C CABLE APPLICATIONS

RELATED APPLICATIONS

This application is a continuation of U.S. Non-Provisional application Ser. No. 16/123,157, filed on Sep. 6, 2018, which claims the benefit of priority to U.S. Provisional Application No. 62/663,382, filed on Apr. 27, 2018, all of which are herein incorporated by this reference in their entirety.

TECHNICAL FIELD

The disclosure relates to the field of electronic circuits, in particular to a USB type-C cable controller chip.

BACKGROUND

Electronic circuits may include individual electronic components, such as resistors, transistors, capacitors, inductors, and diodes, among others, connected by conductive wires or traces through which electric current can flow. Electronic circuits may be constructed using discrete components, or more commonly integrated in an integrated circuit (IC) where the components and interconnections are formed on a common substrate, such as silicon.

BRIEF DESCRIPTION OF THE DRAWINGS

The disclosure is illustrated by way of example, and not of limitation, in the figures of the accompanying drawings.

DETAILED DESCRIPTION

A Universal Serial Bus (USB) Type-C cable controller can be powered by either of the VCONN supply lines coming from opposing ends of a USB Type-C cable. The USB Type-C cable controller is to power off of either supply line at a supply voltage of 3.0V or less. The controller is also to survive a temporary short to VBUS of greater than 20V. Currently, a Type-C cable controller can be powered from either of a first VCONN line (at a first end of the cable) or a second VCONN line (at a second end of the cable) by using isolation diodes that face from VCONN to the internal supply.

These isolation diodes, however, may have a large voltage drop. With a minimum VCONN voltage value of 3.0V, the voltage drop to a cable semiconductor device (e.g., an integrated circuit chip within a Type-C cable) may cause problems for chip operation. If the isolation diodes are implemented externally to have a smaller voltage drop, then the cable material costs increase. During a VBUS short event, the diodes may not prevent the internal cable chip voltage from going high, which could cause the semiconductor device to be damaged.

To address these and other deficiencies, some embodiments may implement the first VCONN to VDDD path (e.g., an internal power supply of the chip, such as Vddd_core) and second VCONN to VDDD path with n-type field effect transistor (NFET) switches. The NFET switches may be implemented as Drain-Extended NFET (DENFETS) transistors that can withstand greater than 20V on the drain side (e.g., the VCONN side). The DENFETS may also be implemented as low-voltage threshold transistors to reduce their resistance and size.

In various embodiments, the DENFET gates may be driven by a voltage supply (e.g., charge pump) of, for example, five volts, which may have two benefits. First, the pump voltage may minimize the resistance for the DENFET when supplying current from the VCONN lines to VDDD. Second, the pump voltage may limit the voltage on VDDD when one of the VCONN line inputs is shorted to an adjacent 20V VBUS terminal. The DENFET does not pass through a voltage higher than Vgs=Vg−Vt, where Vg is the DENFET gate voltage, Vgs is the gate to source voltage difference, and Vt is the DENFET threshold voltage, which ideally is zero or close to zero volts. In a particular embodiment, this may limit the static voltage (of Vddd_core) to no more than about 4.5V.

In response to chip power-up, the DENFET gate voltage is weakly pulled to the associated VCONN supply by a resistor coupled between the VCONN terminal and the gate. To prevent gate damage during a VBUS short event, a diode clamp (e.g., diode chain) may be used to clamp the gate voltage to no more than about 6V. When one VCONN line (e.g., first VCONN line) is actively supplying current to VDDD, the other VCONN line (e.g., second VCONN line) should not be back powered. This is accomplished by driving the gate voltage of the second DENFET to ground, which turns off the second DENFET and limits the back power current to less than one micro-amp. When the second VCONN line becomes active (e.g., passes a threshold voltage), logic circuitry may perform a swapping operation in which the second DENFET of the second VCONN line is turned on while the first DENFET of the first VCONN line is turned off such as to drive the gate voltage of the first DENFET to ground.

In one embodiment, a semiconductor device is configured for a Universal Serial Bus (USB) Type-C cable, e.g., to function as an Electronically Marked Cable Assembly (EMCA) controller. The semiconductor device may include a first terminal to couple to a first VCONN line from a first end of the USB Type-C cable, a second terminal to couple to a second VCONN line from a second end of the USB Type-C cable, a charge pump, and a switch circuit coupled to the first terminal and the second terminal. The switch circuit may include a first DENFET coupled between the first terminal and an internal power supply of the semiconductor device; a first pump switch coupled between the charge pump and a gate of the first DENFET; a second DENFET coupled between the second terminal and the internal power supply; and a second pump switch coupled between the charge pump and a gate of the second DENFET. The switch circuit may be configured to dynamically switch a power supply from one of the first VCONN line or the second VCONN line to the internal power supply (e.g., VDDD) of the semiconductor device back and forth between the first terminal and the second terminal, respectively, as will be explained in detail.

In this way, the semiconductor device may enable dynamically swapping a power supply source between cable ends, depending on which of the first VCONN line and the second VCONN line rises in voltage to a threshold voltage. For purposes of explanation, suppose a use-case scenario in which a cell phone is used with another hand-held device such as a scanner that is also battery powered. The cell phone may be fully charged so the cell phone, at first, may help to power the scanner, e.g., through VCONN or VBUS connections. Over time, however, the cell phone may become nearly depleted of battery power, but the scanner may have more power or be may be plugged into AC power. In this case, the draw of power may swap directions and be pulled from the scanner to the cell phone to charge the cell phone's battery. Many other scenarios are envisioned that may call for swapping direction of power flow through a USB Type-C cable.

A USB-enabled electronic device or a system may comply with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, or later revisions/versions thereof). The USB Type-C specification defines Type-C receptacle, Type-C plug, and Type-C cables that can support USB communications as well as power delivery over newer USB power delivery protocols defined in various revisions/versions of the USB-PD specification.

Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc.

According to the USB Type-C specification(s), a Type-C port provides VBUS, D+, D−, GND, SSTX+, SSTX−, SSRX+, and SSRX− lines, among others. (See FIG. 3 for an exemplary Type-C plug interface.) In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

Figure 1:
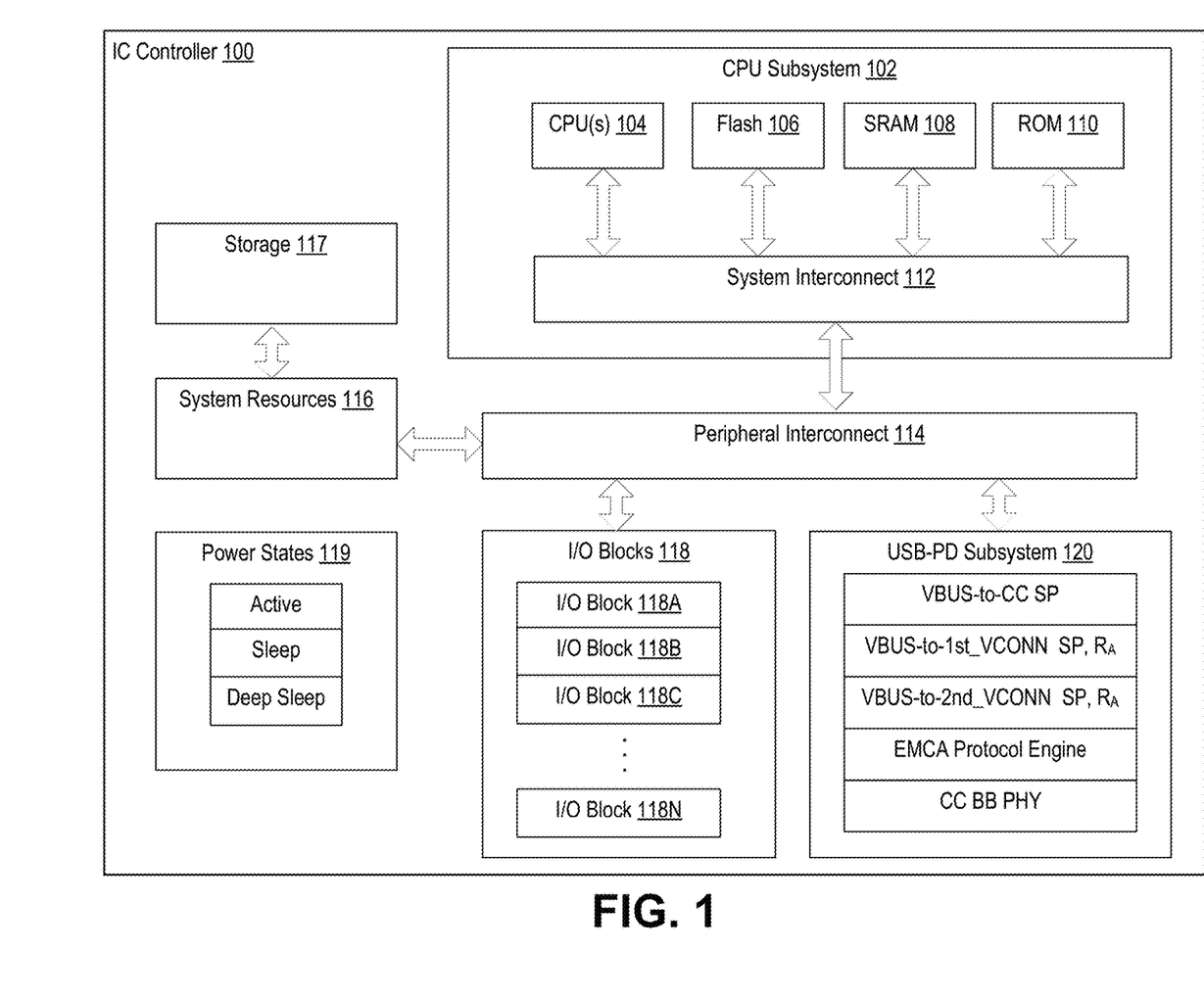
FIG. 1 is a block diagram of a semiconductor device configured in accordance with the techniques for dynamic VCONN swapping in dual-powered Type-C cable applications according to various embodiments.

FIG. 1 is a block diagram of a semiconductor device 100 configured in accordance with techniques for dynamic VCONN swapping in dual-powered Type-C cable applications according to various embodiments. In the embodiments illustrated in FIG. 1, the semiconductor device 100 is an integrated circuit (IC) controller manufactured on a single semiconductor die. For example, the IC controller may be a single-chip IC device from the family of CMGx (or CCG* or CCG3PA*) USB Type-C EMCA controllers developed by Cypress Semiconductor Corporation, San Jose, Calif. The "CMG" stands for Cable Marker Generation. In another example, the IC controller may be a single-chip IC that is manufactured as a System-on-Chip (SoC). In other embodiments, the IC controller may be a multi-chip module encapsulated in a single semiconductor package. Among other components, the IC controller may include a CPU subsystem 102, peripheral interconnect 114, system resources 116, storage 117, various input/output (I/O) blocks 118 (e.g., I/O block 118A through I/O block 118N), and USB-PD subsystem 120. The storage 117 may be programmable over a Type-C interface for storing vendor-specific, device-specific, and cable-specific configuration data.

The CPU subsystem 102 may include one or more CPUs (central processing units) 104, flash memory 106, SRAM (Static Random Access Memory) 108, and ROM (Read Only Memory) 110 that are coupled to system interconnect 112. CPU 104 is a suitable processor that can operate in an IC or a SoC device. In some embodiments, the CPU may be optimized for low-power operation with extensive clock gating and may include various internal controller circuits that allow the CPU to operate in various power states. For example, the CPU may include a wake-up interrupt controller that is configured to wake the CPU from a sleep state, thereby allowing power to be switched off when the IC chip is in the sleep state. The flash memory 106 is non-volatile memory (e.g., NAND flash, NOR flash, etc.) that is configured for storing data, programs, and/or other firmware instructions. The flash memory 106 is tightly coupled within the CPU subsystem 102 for improved access times. The SRAM 108 is volatile memory that is configured for storing data and firmware instructions accessed by CPU 104. The ROM 110 is read-only memory (or other suitable storage medium) that is configured for storing boot-up routines, configuration parameters, and other firmware parameters and settings. The system interconnect 112 is a system bus (e.g., a single-level or multi-level Advanced High-Performance Bus, or AHB) that is configured as an interface that couples the various components of the CPU subsystem 102 to each other, as well as a data and control interface between the various components of the CPU subsystem and peripheral interconnect 114.

The peripheral interconnect 114 is a peripheral bus (e.g., a single-level or multi-level AHB) that provides the primary data and control interface between the CPU subsystem 102 and its peripherals and other resources, such as system resources 116, I/O blocks 118, and a USB-PD subsystem 120. The peripheral interconnect 114 may include various controller circuits (e.g., direct memory access, or DMA controllers), which may be programmed to transfer data between peripheral blocks without burdening the CPU subsystem 102. In various embodiments, each of the components of the CPU subsystem 102 and the peripheral interconnect 114 may be different with each choice or type of CPU, system bus, and/or peripheral bus.

The system resources 116 may include various electronic circuits and components that support the operation of IC controller in its various states and modes. For example, system resources 116 may include circuits such as an integrated oscillator (e.g., to eliminate the need for external clock), power-on-reset (POR) circuit, voltage and current reference generators, etc. The system resources 116 may also include circuits that allow IC controller to draw and/or provide power from/to external sources with several different voltage and/or current levels and to support controller operation in several power states 119 (e.g., deep sleep, sleep and active states). In some embodiments, the system resources may also include a clock subsystem that provides various clocks that are used by the IC controller, as well as circuits that implement various controller functions such as external reset.

The USB-PD subsystem 120 may provide the interface to a USB Type-C port and is configured to support USB communications as well other USB functionality, such as power delivery and battery charging. The USB-PD subsystem 120 may include the electro-static discharge (ESD) protection circuits required on a Type-C port. USB-PD subsystem 120 may also include a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. The USB-PD subsystem 120 may also provide the termination resistors ($R_P$ and $R_D$) and their switches, as required by the USB-PD specification, to implement connection detection, plug orientation detection, and power delivery roles over a Type-C cable. The IC controller (and/or the USB-PD subsystem 120 thereof) may also be configured to respond to communications defined in a USB-PD Specification such as, for example, Start of Packet (SOP), SOP', and SOP" messaging.

Among other circuitry, USB-PD subsystem 120 may further include: a circuit to provide VBUS-to-CC short circuit protection; a circuit to provide VBUS-to-1st_VCONN1 short circuit protection with a termination resistor $R_A$ on the first VCONN line; a circuit to provide VBUS-to-2nd_VCONN short circuit protection with a termination resistor $R_A$ on the second VCONN line; an electronically marked cable application (EMCA) protocol engine logic; and a communication channel PHY (CC BB PHY) logic for supporting communications on a Type-C Communication Channel (CC) line.

In accordance with the techniques described herein, the IC controller may also include additional components disclosed with reference to the semiconductor devices or EMCA controllers as described hereinafter.

Figure 2:
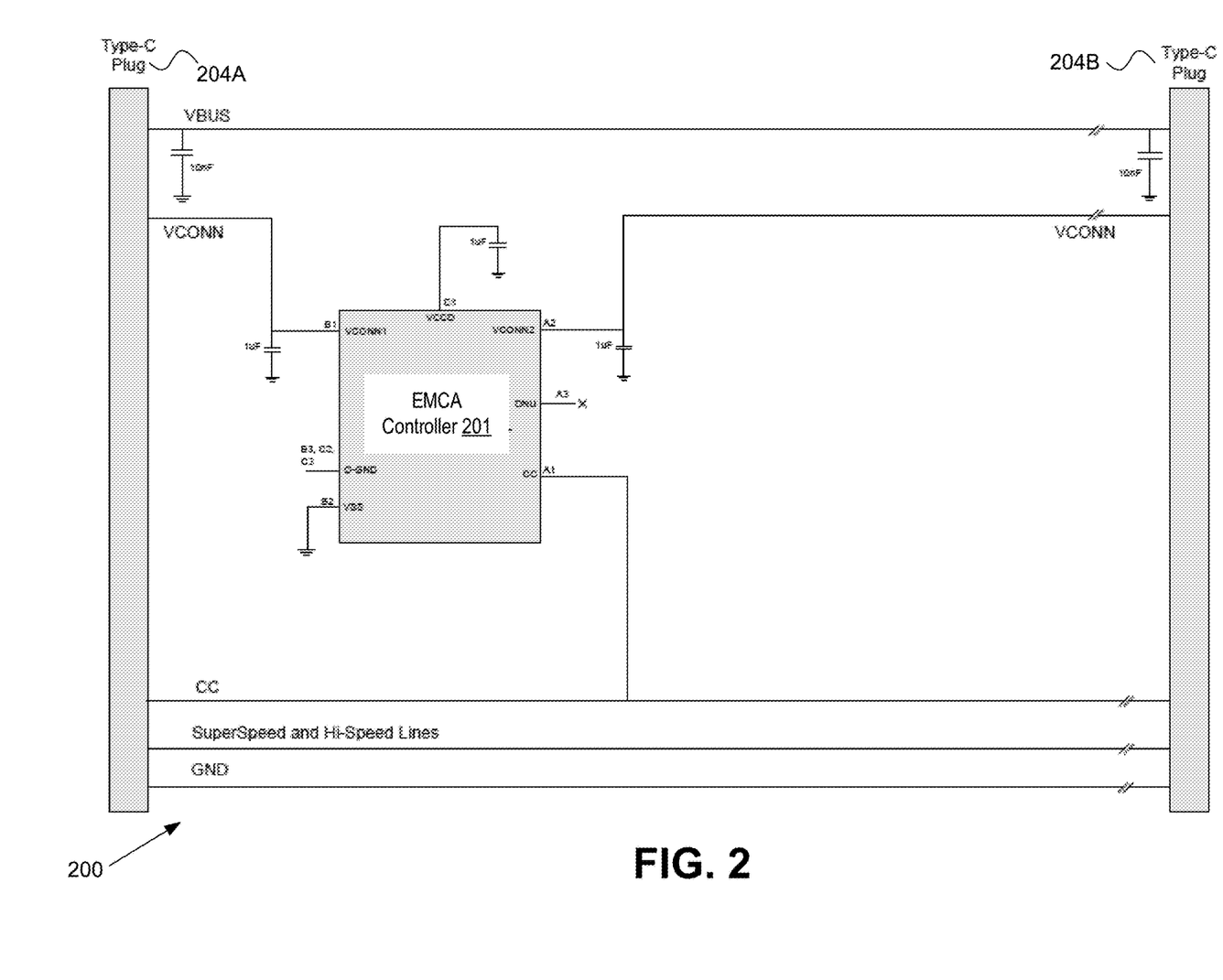
FIG. 2 is a circuit diagram of a USB Type-C cable using an Electronically Marked Cable Assembly (EMCA) controller according to an embodiment.
Figure 3:
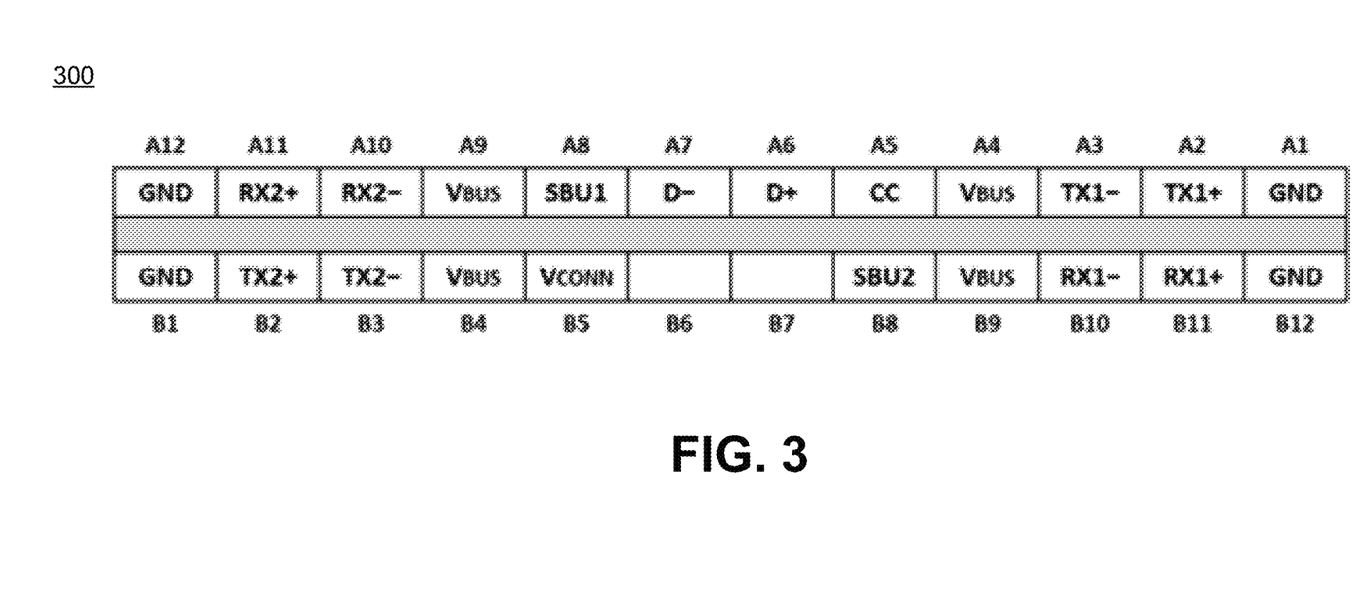
FIG. 3 is a terminal diagram of a USB full-featured Type-C plug interface according to an embodiment.

FIG. 2 is a circuit diagram of a USB Type-C cable 200 using an EMCA controller 201 according to an embodiment. The USB Type-C cable 200 includes a first Type-C plug 204A and a second Type-C plug 204B, one at either end of the cable. As also illustrated in FIG. 3, each Type-C plug 204A and 204B includes terminals for various lines, including VBUS, VCONN, CC, SuperSpeed and Hi-Speed lines, and GND, which were discussed in more detail above. All but the VCONN line is connected from one end to another end of the cable.

The embodiment of FIG. 2 is one of a passive EMCA application in which a single EMCA controller 201 (e.g., CMG1 chip) is deployed in the USB Type-C cable 200. Because a switch circuit (e.g., 408 in FIG. 4) is to be interposed within the VCONN line that passes through the EMCA controller 201, the VCONN line is divided into a first VCONN line (from the first Type-C plug 204A) and a second VCONN line (from the second Type-C plug 204B). A first terminal of the EMCA controller 201 is coupled to the first VCONN line and the second terminal of the EMCA controller 201 is coupled to the second VCONN line. The CC line from both Type-C plugs 204A and 204B are also coupled to the EMCA controller 201.

FIG. 3 is a terminal diagram of a USB full-featured Type-C plug interface 300 according to an embodiment. As aspects of this Type-C plug interface 300 were previously discussed, its description is shortened here. The SSTX+, SSTX−, SSRX+, and SSRX− lines may correspond to the lines illustrated as TX+, TX−, RX+, and RX− lines. There are four VBUS terminals, and note that one of the four VBUS terminals (B4) is situated adjacent the VCONN terminal (B5). Due to this, the EMCA controller 201 is subject to short circuit risk (e.g., when the cable is being plugged in) from one of the VBUS terminals (from either Type-C plug 204A or 204B) shorting into a corresponding VCONN terminal. Short circuit protection is therefore integrated into the expanded design of the EMCA controller 201 as discussed with reference to FIG. 4.

Figure 4:
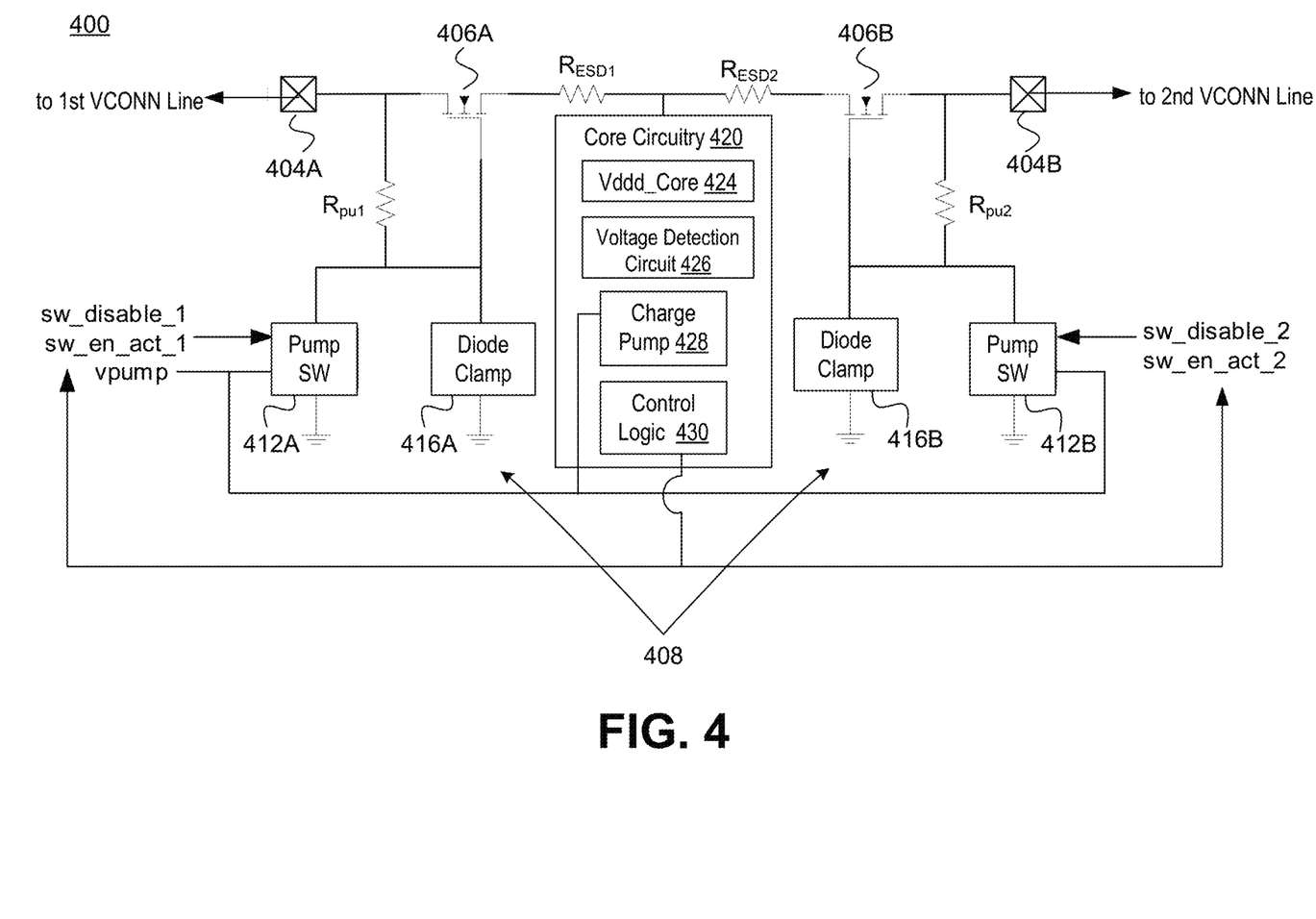
FIG. 4 is a circuit diagram illustrating a semiconductor device to provide power to an EMCA controller and perform dynamic VCONN swapping in dual-powered Type-C cable applications according to an embodiment.

FIG. 4 is a circuit diagram illustrating a semiconductor device 400 to provide power to an EMCA controller and perform dynamic VCONN swapping in dual-powered Type-C cable applications according to an embodiment. In one embodiment, the semiconductor device is the EMCA controller 201 illustrated in FIG. 2. The semiconductor device 400 may include a first terminal 404A, a second terinal 404B, a switch circuit 408, and core circuitry 420. The first terminal 404A may be configured to couple to the first VCONN line within the USB Type-C cable 200 and the second terminal configured to couple to the second VCONN line within the USB Type-C cable 200.

In various embodiments, the switch circuit 408 may include a first drain-extended n-type field effect transistor (DENFET) 406A, a second DENFET 406B, a first pump switch 412A, a second pump switch 412B, a first diode clamp 416A, a second diode clamp 416B, a first pull-up resistor ($R_{pu1}$), a second pull-up resisotr ($R_{pu2}$), a first electrostatic discharge (ESD) resistor ($R_{ESD1}$), and a second ESD resistor ($R_{ESD2}$). In one embodiment, the resistors $R_{pu1}$ and $R_{pu2}$ are each a one mega-ohm (1MΩ) resistor. In one embodiment, the ESD resistors ($R_{ESD1}$ and $R_{ESD1}$) are to provide electrostatic discharge (ESD) protection from an over-current surge from either of the first terminal or the second terminal, respectively.

In embodiments, the core circuitry 420 includes an internal power supply 424, also referred to herein as Vddd_core (or VDDD), a voltage detection circuit 426, a charge pump 428, and control logic 430. In one emboidment, the voltage detection circuit 426 may be incorporated as part of the control logic 430. The internal power supply 424 may, once powered on from one of the first or second VCONN lines, work to power on other components of the semiconductor device 400 and enter active mode.

In some embodiments, the charge pump 428 may be a five volt charge pump designed to fully power on one of the DENFETs 406A or 406B, which has at least two benefits. First, the charge pump 428 minimizes the "on" resistance for the DENFETs when supplying current from one of the VCONN lines to the internal power supply 424. Second, the charge pump 428 limits the voltage on the internal power supply 424 when one of the VCONN voltage inputs is shorted to the 20V VBUS. The DENFETs cannot pass through a voltage higher than Vgs=Vg−Vt, where Vg is the DENFET gate voltage, Vgs is the gate to source voltage difference, and Vt is the DENFET threshold voltage. For the semiconductor device 400, this limits the static voltage (of the internal power supply 424) to no more than 4.5V.

The control logic 430 may be firmware or hardware logic designed to detect various voltage levels and control the first pump switch 412A and the second pump switch 412B to select whether to power the semiconductor device 400 over the first VCONN line or the second VCONN line, as will be explained in more detail.

In one embodiment, the first DENFET 406A is coupled between the first terminal 404A and the core circuitry 420, to include the internal power supply 424. In this case, the extended drain of the first DENFET 406A may be coupled to the first terminal 404A while its source is coupled to one end of the resistor $R_{ESD1}$. The other end of the resistor $R_{ESD1}$ may in turn be coupled to the core circuitry 420. The resistor $R_{pu1}$ is coupled between the first terminal 404A and the gate of the first DENFET 406A. The first pump switch 412A is coupled between the gate of the first DENFET 406A and ground, and is controlled by the control logic 430. The first diode clamp 416A is coupled between the gate of the first DENFET 406A and ground.

In one embodiment, the second DENFET 406B is coupled between the second terminal 404B and the core circuitry 420, to include the internal power supply 424. In this case, the extended drain of the second DENFET 406B may be coupled to the second terminal 404B while its source is coupled to one end of the resistor $R_{ESD2}$. The other end of the resistor $R_{ESD2}$ may in turn be coupled to the core circuitry 420. The resistor $R_{pu2}$ is coupled between the second terminal 404B and the gate of the second DENFET 406B. The second pump switch 412B is coupled between the gate of the second DENFET 406B and ground, and is controlled by the control logic 430. The second diode clamp 416B is coupled between the gate of the second DENFET 406B and ground.

In these embodiments, the charge pump 428 may be coupled to each of the first pump switch 412A and the second pump switch 412B. The control logic 430 may send signals to the first and second pump switches 412A and 412B to determine which is turned on (pulled high to the charge pump voltage) and which is turned off (pulled low to ground, which ensures that the VCONN lines are not back powered). In one embodiment, the first and second DENFETs 406A and 406B are low voltage DENFET switches so as to drop a low voltage between an input terminal to the internal power supply 424, thus passing more power into the Vddd_core.

In various embodiments, the semiconductor device 400 may first power up after one of the first or second Type-C plugs 204A or 204B is plugged into a USB receptacle on another device or into a power socket. For purposes of explanation, assume the first end of the cable was plugged in, thus sending voltage through the first Type-C plug 204A onto the first VCONN line. The first pull-up resistor $R_{pu1}$ may act as a weak voltage pull-up to the gate of the first DENFET 404A, allowing the first DENFET to turn on. When the first DENFET gate voltage is pulled up to the first VCONN line voltage, the first DENFET 406A passes a voltage of VCONN−$Vt_{DENFET}$ to the internal power supply 424, where $Vt_{DENFET}$ is the threshold voltage of the DENFET. This threshold voltage is ideally zero, but in practice can range as high as 0.5V. The voltage supplied by the first VCONN line has been verified to be high enough for the semiconductor device 400 to boot successfully, e.g., so that the internal power supply 242 rises above about 1.65 volts.

After the semiconductor device 400 has booted up (e.g., passed through power up mode), the charge pump 428 may be enabled, causing the pump voltage (vpump) to rise to about five volts (or whatever voltage to which the pump voltage is set). At this point, the first pump switch 412A may pass the pump voltage to the gate of the first DENFET 406A, and the internal power supply (vddd_core) voltage may increase to the minimum of: (1) the voltage on the first VCONN line; and (2) the pump voltage minus the DENFET threshold voltage ($Vt_{DENFET}$). This mode can support the higher active current required by the semiconductor device 400 during normal operation.

During a VBUS short event (e.g., a VBUS-to-1st_V-CONN short), the first VCONN line voltage may increase to the VBUS voltage, e.g., 20V or more. The combination of the 1MΩ resistor $R_{pu1}$ and a maximum voltage across the diode clamp 416A may limit the voltage on the DENFET gate to a maximum voltage, such as no more than about five to six volts. The drain of the DENFETs can withstand the high voltage (greater than 20V), according to design. This means that the semiconductor device 400 can operate normally even when VCONN is 20V or higher. Each of the diode clamps may be made of multiple diode-connected NFETs to clamp the voltage to a desired level (such as 5-6V as just discussed) while each of the pull-up resistors limits the current. Thus, in one embodiment, each of the diode clamps 416A and 416B may include a series of five (or six), one-volt NFETs. In some embodiments, the ESD resistors ($R_{ESD1}$ and $R_{ESD2}$) coupled between a source of each respective DENFET to the internal power supply 424 is to protect against ESD current that could flow from the first VCONN line (or the second VCONN line) to the core circuitry 420 during an ESD event on the first VCONN pin (or the second VCONN pin).

In various additional embodiments, the discussion above with reference to the first VCONN line and the half of the switch circuit 408 coupled to the first terminal 404A is equally applicable to second VCONN line and the other half of the switch circuit 408 coupled to the second terminal 404B.

In embodiments, the control logic 430 may send a number of signals to the first and second pump switches 412A and 412B, to turn them on or off depending on whether a threshold voltage has been detected coming from either or both of the first VCONN and second VCONN lines, as will be discussed in more detail with reference to FIG. 5. These signals are illustrated in FIG. 4 as a first switch disable signal (sw_disable_1) and a first switch enable active signal (sw_en_act_1) to the first pump switch 412A and a second switch disable signal (sw_disable_2) and a second switch enable active signal (sw_en_act_2) to the second pump switch 412B. The threshold voltage may be detected by the voltage detection circuit 426 of the core circuitry 420.

Figure 5:
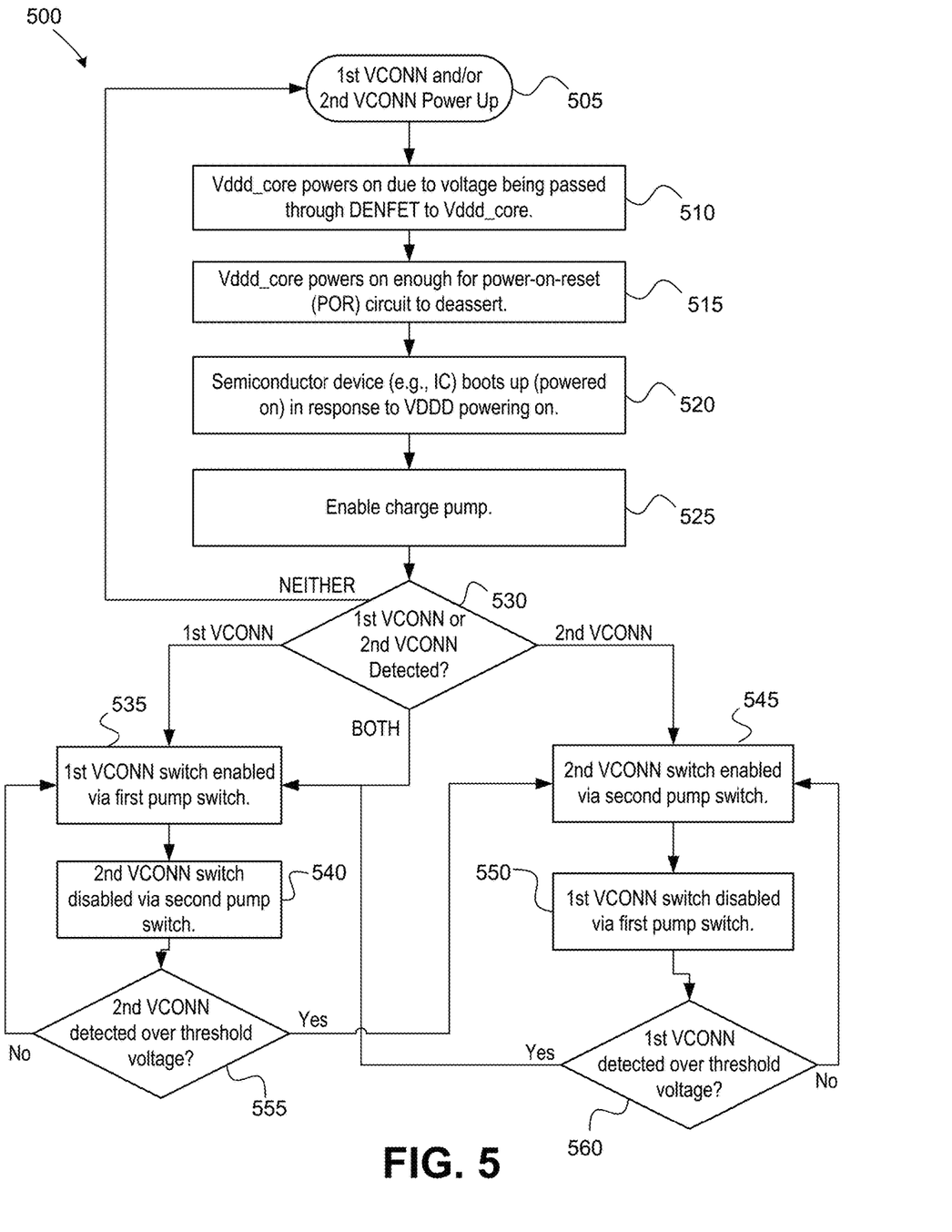
FIG. 5 is a flow chart for a method of powering on an EMCA controller and performing dynamic VCONN swapping in dual-powered Type-C cable applications according to an embodiment.

FIG. 5 is a flow chart for a method 500 of powering on an EMCA controller and performing dynamic VCONN swapping in dual-powered Type-C cable applications according to an embodiment. The method 500 may be performed by processing logic that comprises hardware (e.g., circuitry, dedicated logic, programmable logic, microcode, etc.). In one embodiment, the method 500 is performed wholly or at least partially by the control logic 430 (FIG. 4) and may be performed to operate the semiconductor device 400. Some steps to the method, particularly in power up mode, may be performed organically by the circuitry of the switch circuit 408 before transition to active mode as will be explained.

With reference to FIG. 5, the method 500 may begin with powering on the first DENFET from a voltage, received at the first terminal from the first VCONN line, falling across the first pull-up resistor ($R_{pu1}$) that is coupled between the first terminal and a gate of the first DENFET (505). This initial power up may alternatively, or additionally, occur by powering up the second DENFET from a voltage, received at the second terminal from the second VCONN line, falling across the second pull-up resistor ($R_{pu2}$) that is coupled between the second terminal and a gate of the second DENFET. The method 500 may continue with powering on an internal power supply (Vddd_core) of the semiconductor device in response to the voltage being passed through the first DENFET (and/or through the second DENFET) to the internal power supply (510). The method 500 may continue with the internal power supply powering on to a sufficient level to deassert a power-on-reset (POR) circuit of the semiconductor device (520).

In various embodiments, the steps performed at blocks 505 through 520 may be understood to encompass the power up mode of the semiconductor device 400. The starting point is with both first and second VCONN supplies at 0V and the semiconductor device is unpowered. When one or both of the VCONN supplies rises high enough to start powering the semiconductor device 400, the weak pull-up on resistors $R_{up1}$ or $R_{up2}$, respectively, allows enough voltage to pass through to the vddd_core for the semiconductor device 400 to come out of POR and boot up, as described previously. During power-up mode, both VCONN control signals are set to sw_disable*=0 and sw_en_act*=0, which allows the weak pull-up resistors ($R_{up1}$ and $R_{up2}$) to control the gates of the DENFETs.

With continued reference to FIG. 5, the method 500 may continue after being powered up with transition to active mode, and operating the control logic 430 of the semiconductor device 400 to fully power on the first DENFET, in response to the powering up of the semiconductor device 400. The method 500 may continue with enabling the charge pump that is coupled to the first pump switch and to the second pump switch (525). At this point, the semiconductor device 400 is ready to choose from which the first or second VCONN supplies to power the semiconductor device 400.

The method 500 may continue with the processing logic detecting a voltage from the first VCONN line or the second VCONN line that exceeds a threshold voltage (e.g., 2.7V in one embodiment) (530). It is possible that the USB Type-C cable is unplugged at this point, so if neither the first or second VCONN lines are detected with a sufficiently high voltage, then the method 500 may loop back to power up mode (505). If, however, the voltage from the first VCONN line or both the first and second VCONN lines exceeds the threshold voltage, then the method 500 may continue with the processing logic turning on the first pump switch to pass a pump voltage from the charge pump to the gate of the first DENFET, to fully activate the first DENFET (535). This may be performed by setting the first switch enable active signal (sw_en_act_1) to one, which drives the pump voltage onto the gate of the first DENFET. The method 500 may continue with the processing logic turning off the second pump switch to disable the second DENFET, which pulls the gate of the second DENFET to ground (540). This may be performed by setting the second switch enable active signal (sw_en_act_2) to the second pump switch to zero, and the second switch disable signal (sw_disable_2) to the second pump switch to one, which pulls the gate of the second DENFET to ground, disabling the second pump switch.

With continued reference to FIG. 5, if instead at block 530, a voltage on the second VCONN line exceeds the threshold voltage, then the method 500 may continue with the processing logic turning on the first pump switch to pass a pump voltage from the charge pump to the gate of the first DENFET, to fully activate the first DENFET (545). This may be performed by setting the second switch enable active signal (sw_en_act_2) to one, which drives the pump voltage onto the gate of the second DENFET. The method 500 may continue with the processing logic turning off the second pump switch to disable the second DENFET, which pulls the gate of the second DENFET to ground (550). This may be performed by setting the first switch enable active signal (sw_en_act_1) to the first pump switch to zero, and the first switch disable signal (sw_disable_1) to the first pump switch to one, which pulls the gate of the first DENFET to ground, disabling the first pump switch. Performing the steps of blocks 545 and 550 may complete a swap of powering the semiconductor device over the first VCONN line to the second VCONN line.

Assuming the semiconductor device 400 is being powered over the first VCONN line, e.g., through the first DENFET, the method 500 may continue with the processing logic detecting whether a voltage from the second VCONN line exceeds the threshold voltage (555). If the voltage from the second VCONN line exceeds the threshold voltage, the method 500 may continue with performing a power swap, as discussed previously with reference to blocks 545 and 550.

Further, assuming the semiconductor device 400 is being powered over the second VCONN line, e.g., through the second DENFET, the method 500 may continue with the processing logic detecting whether a voltage from the first VCONN line exceeds the threshold voltage (555). If the voltage from the first VCONN line exceeds the threshold voltage, the method 500 may continue with performing a power swap, as discussed previously with reference to blocks 535 and 540. In this way, a round robin of swapping power sources between the first VCONN line and the second VCONN line and back to the first VCONN line may be performed depending on voltages and the first and second terminals exceeding the threshold voltage.

With additional reference to FIG. 4, in some cases transitions between triggering a threshold voltage at any given terminal may be slow. For example, with logic generally ranging between 0 at about zero volts and 1 at about 5 volts, a slow transition near 2.5 volts may cause rapid swapping of being powered between the first and second terminals. This activity may cause unknown states in transitions as described with reference to FIG. 5. To prevent unknown states, the voltage detection circuit 426 may include hysteresis to latch the voltage detector to a logic value, either zero or one, and prevent rapid transitions. In another embodiment, the control logic 430 may be adapted with logic filtering, in which the detection of reaching a logic zero or a logic one is triggered only after a static voltage level is reached for a predetermined period of time.

For example, in one embodiment, the method 500 may include the processing logic (at block 555 of FIG. 5) detecting multiple, successive changes in the voltage from the second terminal that passes back and forth between exceeding the threshold voltage and not exceeding the threshold voltage. The method 500 may continue with the processing logic waiting until the voltage from the second terminal exceeds the threshold voltage for a predetermined amount of time before turning on the second pump switch and turning off the first pump switch, to cause a swap to being powered via the second terminal.

Figure 6:
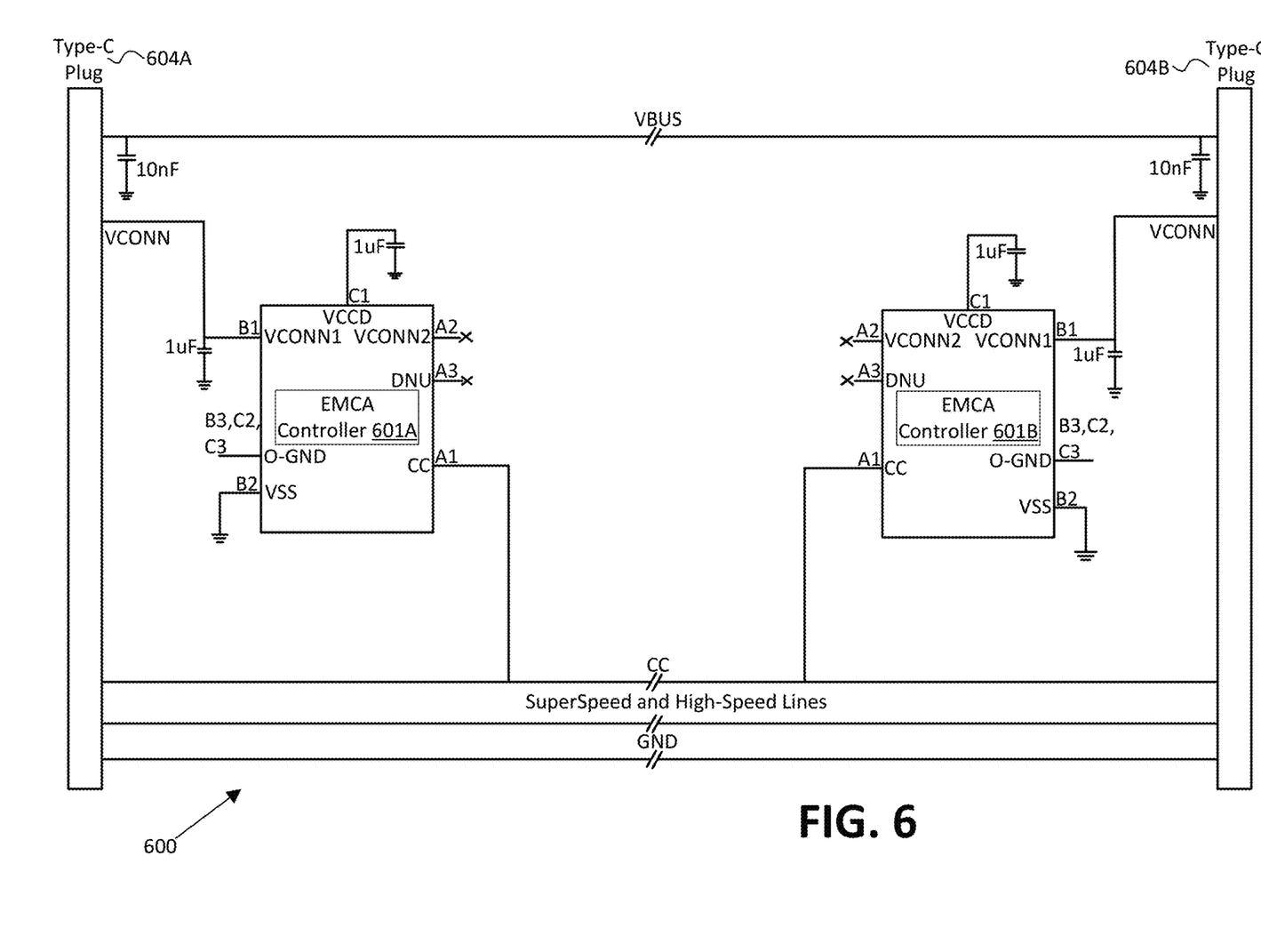
FIG. 6 is a circuit diagram of a USB Type-C cable using an EMCA controller coupled to each of the Type-C plug interfaces of the USB Type-C cable according to an embodiment.

FIG. 6 is a circuit diagram of a USB Type-C cable 600 using an EMCA controller coupled to each of the Type-C plug interfaces of the USB Type-C cable 600. For example, in this alternative embodiment, the USB Type-c cable 600 may include a first Type-C plug interface 604A and a second Type-C plug interface 604B. A first EMCA controller 601A may include a first VCONN terminal coupled to the first VCONN line of a first end of the USB Type-C cable 600, e.g., coupled to the first Type-C plug interface 604A. A second EMCA controller 601B may include a second VCONN terminal coupled to the second VCONN line of a second end of the USB Type-C cable 600, e.g., coupled to the second Type-C plug interface 604B. In some embodiments, only the controller of the first and second EMCA controllers 601A and 601B that is closest to a host (e.g., a down-facing port, or DFP) connected to the USB Type-B cable may be powered on.

In the illustrated embodiment, the second VCONN terminal of each of the first and second EMCA controllers 601A and 601B may be left floating (not connected). In another embodiment, each of the first and second EMCA controllers 601A and 601B may include half the circuitry of the switch circuit 408, e.g., only the circuitry associated with powering the chip over the first terminal, which is to couple to the only VCONN line at each end of the cable. The CC line may also be coupled to each of the first and second EMCA controllers 601A and 601B.

In the embodiment of FIG. 6, the control logic 430 for controlling dual switching is not necessary because each of the first and second EMCA controllers 601A and 601B may detect only a voltage from the first VCONN line and second VCONN line, respectively, and power the respective controller accordingly. Accordingly, the control logic 430 may be adapted to just turn on or off the single pump switch depending on whether the voltage at the voltage terminal exceeds a threshold voltage. Alternatively, the control logic 430 may be left unmodified and still function as intended even if the second terminal is left floating.

The EMCA controllers illustrated in the embodiments of FIGS. 2 and 6 may be disposed within passive USB Type-C cables. The distinction between a passive and active cable is that, in addition to a Type-C controller chip, an active cable also has a clock and data recovery (CDR) chip (with components such as repeaters, bridges, and the like) that allows for a longer cable. The CDR chip may be employed for the high speed data on the TX* and RX* lines.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electromagnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A semiconductor device for a Universal Serial Bus (USB) Type-C cable, the semiconductor device comprising:
    a first terminal to couple to a first VCONN line from a first end of the USB Type-C cable;
    a second terminal to couple to a second VCONN line from a second end of the USB Type-C cable;
    a voltage boost circuit; and
    a switch circuit coupled to the first terminal and the second terminal, the switch circuit comprising:
        a first transistor coupled between the first terminal and an internal power supply of the semiconductor device;
        a first resistive element coupled between the first terminal and a control terminal of the first transistor;
        a first clamp coupled between the control terminal of the first transistor and ground;
        a first switch coupled between the voltage boost circuit and the control terminal of the first transistor;
        a second transistor coupled between the second terminal and the internal power supply;
        a second resistive element coupled between the second terminal and a control terminal of the second transistor;
        a second clamp coupled between the control terminal of the second transistor and ground; and
        a second switch coupled between the voltage boost circuit and the control terminal of the second transistor.

2. The semiconductor device of claim 1, wherein the switch circuit is configured to dynamically switch a power supply from one of the first VCONN line and the second VCONN line to the internal power supply of the semiconductor device back and forth between the first terminal and the second terminal, respectively.

3. The semiconductor device of claim 1, further comprising hardware logic coupled to the internal power supply, to the first switch, and to the second switch, the hardware logic to, upon start up:
    detect a voltage coming from one of the first terminal or the second terminal; and
    turn on one of the first switch or the second switch corresponding to the one of the first terminal or the second terminal from which the voltage was detected, to pass a pump voltage from the voltage boost circuit to the control terminal of one of the first transistor or second transistor, respectively.

4. The semiconductor device of claim 3, wherein the hardware logic is further to:

during start up, set a switch disable signal and a switch enable active signal to zero for each of the first switch and the second switch; and in response to detection of the voltage coming from the first terminal:
set to one the switch enable active signal to the first switch;
set to zero the switch enable active signal to the second switch; and
set to one the switch disable signal to the second switch.

5. The semiconductor device of claim 1, wherein the first and second transistors are n-type field effect transistors (NFETs).

6. A semiconductor device for a Universal Serial Bus (USB) Type-C cable, the semiconductor device comprising:
a first terminal to couple to a first VCONN line from a first end of the USB Type-C cable;
a second terminal to couple to a second VCONN line from a second end of the USB Type-C cable;
a voltage boost circuit; and
a switch circuit coupled to the first terminal and the second terminal, the switch circuit comprising:
a first transistor coupled between the first terminal and an internal power supply of the semiconductor device;
a first resistive element coupled between a source of the first transistor and the internal power supply of the semiconductor device;
a first switch coupled between the voltage boost circuit and a control terminal of the first transistor;
a second transistor coupled between the second terminal and the internal power supply;
a second resistive element coupled between a source of the second transistor and the internal power supply; and
a second switch coupled between the voltage boost circuit and a control terminal of the second transistor,
wherein the first resistive element and the second resistive element are to provide electrostatic discharge (ESD) protection from an over-current surge from either of the first terminal or the second terminal, respectively.

7. A method comprising:
operating a semiconductor device for a Universal Serial Bus (USB) Type-C cable, the semiconductor device comprising a first terminal, a first transistor coupled between the first terminal and an internal power supply, a first switch coupled to a control terminal of the first transistor, and control logic coupled to the first switch, wherein operating the semiconductor device comprises:
powering on the first transistor from a voltage, received at the first terminal, falling across a resistive element that is coupled between the first terminal and a control terminal of the first transistor;
powering on an internal power supply of the semiconductor device in response to the voltage being passed through the first transistor to the internal power supply;
powering up the semiconductor device in response to the powering on the internal power supply; and
operating the control logic of the semiconductor device to fully power on the first transistor, and thus enter an active mode of the semiconductor device, in response to the powering up of the semiconductor device.

8. The method of claim 7, wherein the powering on the internal power supply is to a voltage level that is to de-assert a power-on-reset circuit of the semiconductor device.

9. The method of claim 7, wherein the semiconductor device further comprises a second terminal, a second control terminal coupled between the second terminal and the internal power supply, a second switch coupled to a control terminal of the second transistor and to the control logic, and wherein operating the control logic further comprises:
enabling a voltage boost circuit that is coupled to the first switch and to the second switch;
first detecting, by a voltage detection circuit, that a voltage from the first terminal exceeds a threshold voltage; and
in response to the first detecting:
turning on the first switch to pass a pump voltage from the voltage boost circuit o the control terminal of the first transistor, to fully activate the first transistor; and
turning off the second switch to disable the second transistor, which pulls the control terminal of the second transistor to ground.

10. The method of claim 9, wherein operating the control logic further comprises:
during powering on of the semiconductor device, setting a switch disable signal and a switch enable active signal to zero for each of the first switch and the second switch; and
in response to detecting the voltage coming from the first terminal:
setting to one the switch enable active signal to the first switch;
setting to zero the switch enable active signal to the second switch; and
setting to one the switch disable signal to the second switch.

11. The method of claim 9, wherein the first detecting the voltage from the first terminal further comprises also detecting a second voltage from the second terminal that is greater than the threshold voltage.

12. The method of claim 9, further comprising:
second detecting, by the voltage detection circuit, that a voltage from the second terminal exceeds the threshold voltage;
in response to the second detecting:
turning on the second switch to pass the pump voltage from the voltage boost circuit to the control terminal of the second transistor, to fully activate the second transistor; and
turning off the first switch to disable the first transistor, which pulls the control terminal of the first transistor to ground.

13. The method of claim 12, further comprising:
detecting multiple, successive changes in the voltage from the second terminal that passes back and forth between exceeding the threshold voltage and not exceeding the threshold voltage; and
waiting until the voltage from the second terminal exceeds the threshold voltage for a predetermined amount of time before turning on the second switch and turning off the first switch, to cause a swap to being powered via the second terminal.

14. A system comprising:
a first USB Type-C plug at a first end of a USB Type-C cable;
a first VCONN line coupled to the first USB Type-C plug; and a first integrated circuit (IC) controller comprising:
  a first terminal coupled to the first VCONN line;
  a first transistor coupled between the first terminal and a first internal power supply of the first IC controller;
  a first switch coupled between a first voltage boost circuit and a control terminal of the first transistor;
  a first resistive element coupled between the first terminal and the control terminal of the first transistor;
  a first clamp coupled between the control terminal of the first transistor and ground; and
  first hardware logic coupled to the first switch, to the first voltage boost circuit, and to the first internal power supply, the first hardware logic to:
    detect a received voltage coming from the first terminal; and
    turn on the first switch in response to detection of the received voltage from the first terminal, to pass a control voltage from the first voltage boost circuit to the control terminal of the first transistor.

15. The system of claim 14, further comprising:
a second USB Type-C plug at a second end of the USB Type-C cable;
a second VCONN line coupled to the second USB Type-C plug; and
a second IC controller comprising:
  a second terminal coupled to the second VCONN line;
  a second transistor coupled between the second terminal and a second internal power supply;
  a second switch coupled between a second charge pump and a control terminal of the second transistor; and
  second hardware logic coupled to the second switch, to the second charge pump, and to the second internal power supply, the second hardware logic to:
    detect a voltage coming from the second terminal; and
    turn on the second switch in response to detection of the voltage from the second terminal, to pass a pump voltage from the second charge pump to the control terminal of the second transistor.

16. The system of claim 14, further comprising:
a second USB Type-C plug at a second end of the USB Type-C cable;
a second VCONN line coupled to the second USB Type-C plug; and
wherein the first IC controller further comprises:
  a second terminal coupled to the second VCONN line of the USB Type-C cable;
  a second transistor coupled between the second terminal and the first internal power supply; and
  a second switch coupled between the first charge pump and a control terminal of the second transistor; and
wherein the first hardware logic is further coupled to the second switch and is to:
  detect a threshold voltage coming from the second terminal;
  turn on the second switch in response to detection of the voltage from the second terminal, to pass a voltage from the first charge pump to the control terminal of the second transistor; and
  turn off the first switch.

17. The system of claim 16, wherein the hardware logic is further to:
during start up, set a switch disable signal and a switch enable active signal to zero for each of the first switch and the second switch; and
in response to detection of the voltage coming from the second terminal:
  set to one a switch enable active signal to the second switch;
  set to zero a switch enable active signal to the first switch; and
  set to one the switch disable signal to the first switch.

18. A system comprising:
a first USB Type-C plug at a first end of a USB Type-C cable;
a first VCONN line coupled to the first USB Type-C plug; and
a first integrated circuit (IC) controller comprising:
  a first terminal coupled to the first VCONN line;
  a first transistor coupled between the first terminal and a first internal power supply of the first IC controller;
  a first resistive element coupled between a source of the first transistor and the first internal power supply;
  a first switch coupled between a first voltage boost circuit and a control terminal of the first transistor; and
  a second resistive element coupled between a source of a second transistor coupled between a second terminal coupled to a second VCONN line and the first internal power supply;
  first hardware logic coupled to the first switch, to the first voltage boost circuit, and to the first internal power supply, the first hardware logic to:
    detect a received voltage coming from the first terminal, and
    turn on the first switch in response to detection of the received voltage from the first terminal, to pass a control voltage from the first voltage boost circuit to the control terminal of the first transistor; and
  wherein the first resistive element and the second resistive element are to provide electrostatic discharge (ESD) protection from an over-current surge from either of the first terminal or the second terminal, respectively.

* * * * *